Dec. 19, 1961   R. E. MAIER ET AL   3,013,309
EXTRUSION METHOD

Filed July 7, 1958   2 Sheets-Sheet 1

INVENTORS
ROBERT EDWARD MAIER
FRANK CLYDE STARR, JR.

BY  *A. McAlevy*

ATTORNEY

Dec. 19, 1961 R. E. MAIER ET AL 3,013,309
EXTRUSION METHOD
Filed July 7, 1958 2 Sheets-Sheet 2

INVENTORS
ROBERT EDWARD MAIER
FRANK CLYDE STARR, JR.

BY *A. McAleny*

ATTORNEY

United States Patent Office 3,013,309
Patented Dec. 19, 1961

3,013,309
EXTRUSION METHOD
Robert Edward Maier, Northbrook, Pa., and Frank Clyde Starr, Jr., Wilmington, Del., assignors to E. I. du Pont de Nemours and Company, Wilmington, Del., a corporation of Delaware
Filed July 7, 1958, Ser. No. 746,825
7 Claims. (Cl. 18—55)

This invention relates to a novel extrusion method, suitable for use in the extrusion of elastomers and thermoplastic material, especially those forming viscoelastic melts, such as natural rubber, polyethylene, polypropylene, synthetic rubbers, and the like.

Heretofore, extrusion dies have been designed which have an interior wall profile adapted to apply compacting pressure on the plastic material which is being extruded. Generally, the die channel has been of a converging shape, although in certain instances pressure equalizing chambers have been provided in such dies. These chambers or enlargements, along the extrusion die, as disclosed in the Weinand U.S. Patent 2,696,640, issued December 14, 1954, have, however, also produced a converging flow of the thermoplastic material, which detracted from their effectiveness in facilitating the extrusion of high viscosity materials.

An object of this invention is to provide an extrusion method capable of producing extrudates which do not have the disadvantages of methods heretofore employed. Another object is to increase the rate at which satisfactory extrudates can be produced. Further objects of the invention are to reduce power costs, control the dimensions of extrudates, and avoid stresses in extruded products.

These objects are accomplished, according to the present invention by means of a novel extrusion method which effects a cutting of the plastic melt, instead of applying a compacting pressure thereto, prior to the release of the melt from the die.

Figure 1:
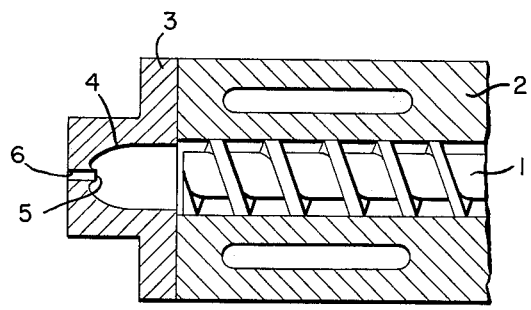

The invetion will be better understood by reference to the accompanying drawing. FIGURE 1 is a cross-section view showing an extruder screw 1 rotatable within an extruder barrel 2, and adapted to move plastic material into a die 3 having an inner wall profile 4 such that the plastic melt is cut by the circular knife-edge 5 before its release from the die opening 6.

Figure 2:
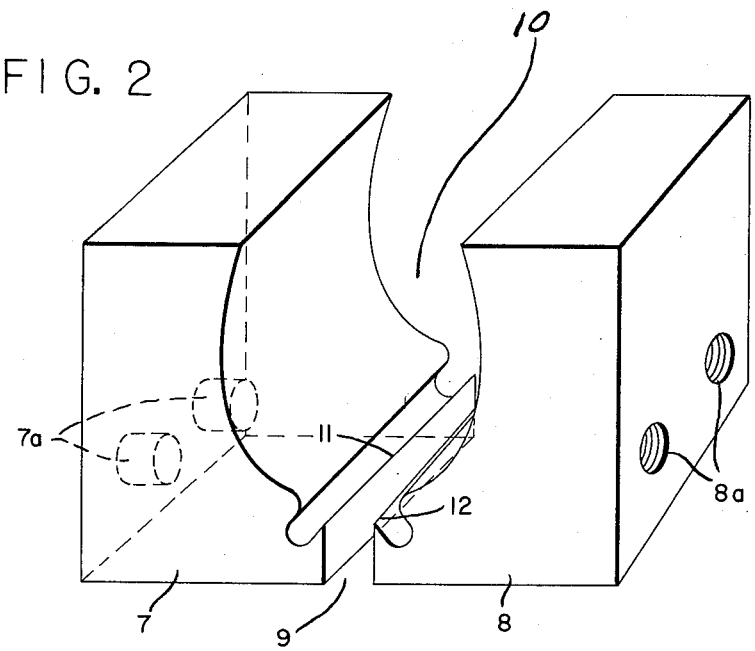

FIGURE 2 is a side view of another embodiment of the invention, namely a film extrusion die with the side plates removed to show the contour of the inner wall of the die. This die is composed of two jaws 7 and 8 so positioned as to produce a slit 9. These jaws can be bolted to an extruder, not shown, which feeds the melt into the die chamber 10 from a position centrally located above said chamber, through a suitable head member, not shown. The jaws contain bores 7a and 8a, so that they may be bolted to the extruder head. The contour of the inner wall of the die is such that there are knife-edges 11 and 12 which cut the viscous melt before its release from the die slit 9.

Figure 3:
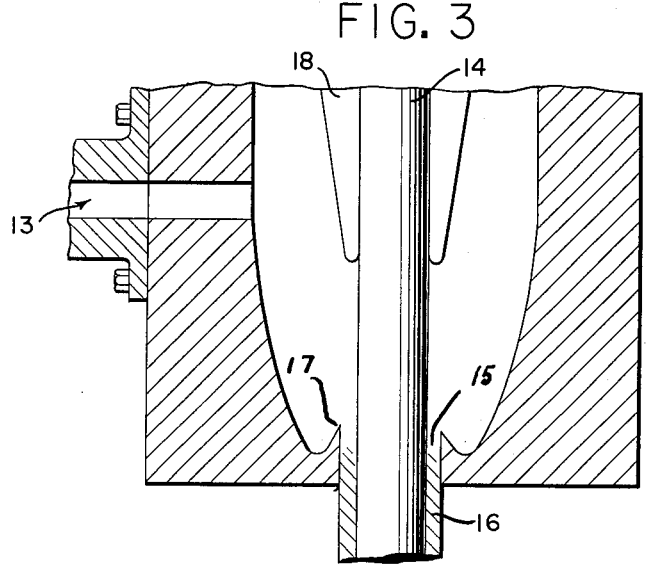

FIGURE 3 is a cross-section view of another embodiment, namely a cross-head die for wire coating. The plastic material enters the die from an extruder not shown, through the entrance 13, and surrounds the wire 14 which moves towards and through the die opening 15. As the wire passes through this die opening, it becomes covered with a coating 16 of the plastic material, which is later cooled by known means such as by contact with a cool fluid or a cool solid surface. The circular knife-edge 17 cuts the plastic melt before it is released from the die as a coating on the wire. The wire enters the cross-head by a feeding means not shown, and is held in position as it passes through the cross-head by the guide 18.

In the embodiment shown in FIGURES 1 and 3 the knife-edge constitutes the entire periphery of the wall of the exit passage, i.e. the die opening, closest to the extruder. In FIGURE 2, however, the knife-edge constitutes only a part of that periphery, since the end plates themselves are not equipped with such a knife-edge.

Figure 4:
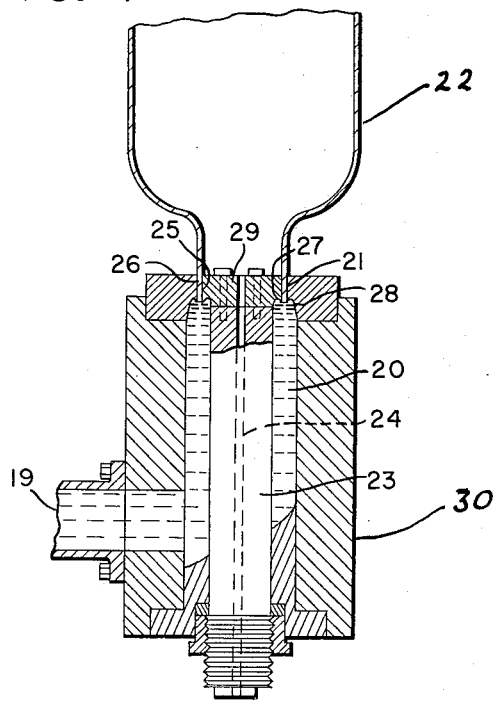

FIGURE 4 is a cross-section view of a circular die for extruding blown film of plastic material. Molten plastic material (usually polyethylene) enters the die through the inlet 19, and passes through the chamber 20 to the circular exit passage 21, out of which emerges a bubble of film 22. This bubble is cooled by means of an air blast not shown, whereby it solidifies. It is thereafter rolled up on suitable wind-up rolls not shown. A post 23 which is centrally positioned within the chamber 20 contains an air passage 24 through which a pressure of air is maintained to keep the bubble 22 inflated. The exit passage 21 is formed by two concentric walls 25 and 26, the periphery of each at points opposing the direction of the flow of the plastic melt, constitute circular knife-edges 27 and 28. The interior wall 25 is on a member 29 which is in fixed relationship with the central post 23. The outer wall 26 of the exit passage may be in fixed relationship with the housing 30. If desired the entire die may be permitted to rotate by means not shown, to distribute any imperfections in the film so that they are not superimposed during wind-up. In the latter embodiment the inlet is at the base of the die rather than at the side thereof.

Numerous other embodiments of the invention are possible. For example, although the plane of the knife-edge is usually at right angles to the wall or walls defining the exit passage, this is not necessary, and the contour of the chamber wall can be designed so that the contour of the knife-edge is angularly disposed in relation to said wall or walls.

The embodiment shown in FIGURE 4 can be modified slightly to produce other forms of tubing, such as pipe, instead of blown film, by employing a suitable distance between the walls 25 and 26, and by omitting the disclosed means for producing the bubble. A very important embodiment of the invention is the production of pipe in this manner.

The advantages of the present invention can be shown by comparing the rate of extrusion of plastic material using the novel die herein disclosed with the rate achieved with similar dies not having the herein disclosed cutting edge. The following example serves to illustrate certain of these advantages.

*Example I*

Into a die such as that shown in FIGURE 2, polyethylene having a melt index of about 1.3 was ejected by means of an extruder. The slit opening was 30 mils in the thickness dimension, and ½ inch wide. The ribbon thus produced had the same dimensions as the slit, except when the ribbon was subjected to draw-down. The rate of extrusion was 46 pounds per hour. Under the same conditions, but eliminating the knife-edge in the die contour, the rate was only 6 pounds per hour. The experiment was repeated using a polyethylene having a melt index of 1.6. Using the die of FIGURE 2, the rate was 69 pounds per hour and without the knife-edge in the die contour the rate, under conditions otherwise the same, was only 12 pounds per hour. The experiment was repeated again, using polyvinyl butyral as the plastic material. The rate with the die of FIGURE 2 was 89 pounds per hour, and without the knife-edge in the die contour it was only 9.3 pounds per hour. In the latter experiment a slight draw-down was employed, and the extrudate had a rectangular cross-section, the dimensions of which depended on the take-off rate. The experiment was still again repeated, using a low flow polyethylene (melt index, 0.2). With the knife-edge the rate was 25.5 pounds per hour, and without the knife-edge the rate was 7 pounds per hour.

In the foregoing example, when the knife-edge was present in the die, the cross-section contour of the extrudate was under excellent control and conformed much more closely with the shape of the die, than in previously known devices.

The invention is highly useful not only in the production of sheets, films, ribbons, safety glass interlayers, and the like as hereinabove illustrated, but is also beneficial in the production of bristles and other monofilaments, including those of non-circular cross-section (i.e. elliptical, cruciform, rectangular, etc.), and especially in the production of plastic pipe, tubes, blown film (through the use of circular dies), coatings for substrates, certain molded shapes, blow-molding and the like.

We claim:

1. The method for forming an extrudate of controlled cross-section dimensions, which comprises extruding molten plastic material into an extrusion die member having a chamber communicating with said extruder, said chamber having also an exit passage orifice for release of said plastic material from said die member through an exit passage, said passage having a wall of which the periphery at the edge facing the flow of plastic is a knife-edge, cutting the said plastic material by said knife-edge as it enters the said exit passage, and permitting the said plastic material after said cutting to emerge from the said exit passage, said knife-edge being located parallel to the orifice opening and extending inwardly from the opening so as to cut the plastic material as it flows through the orifice.

2. Method of claim 1 wherein the said plastic material is polyethylene.

3. Method of claim 1 wherein the said plastic material is polyvinyl butyral.

4. Method of claim 3 wherein the said polyvinyl butyral is subjected to draw-down as it emerges from the exit passage.

5. Method of claim 1 wherein the exit passage is the space between two walls, the periphery of each of which opposing the flow of the plastic material is a circular knife-edge, said knife-edges being concentric and cutting, the plastic material as it enters the said exit passage, the form of the extrudate being therefore tubular.

6. Method of claim 5 wherein the extrudate is in the form of blown film.

7. Method of claim 5 wherein the extrudate is in the form of pipe.

References Cited in the file of this patent

UNITED STATES PATENTS

| | | |
|---|---|---|
| 1,984,038 | Shaw et al. | Dec. 11, 1934 |
| 2,364,552 | Reichel | Dec. 5, 1944 |
| 2,479,804 | Bailey et al. | Aug. 23, 1949 |
| 2,709,834 | Johnson | June 7, 1955 |
| 2,813,301 | Underwood | Nov. 19, 1957 |

FOREIGN PATENTS

| | | |
|---|---|---|
| 127,825 | Australia | June 3, 1948 |
| 706,111 | Great Britain | Mar. 24, 1954 |